United States Patent
Chrabieh et al.

(10) Patent No.: US 8,724,738 B2
(45) Date of Patent: *May 13, 2014

(54) MULTIDIMENSIONAL CONSTELLATIONS FOR CODED TRANSMISSION

(75) Inventors: Rabih Chrabieh, Paris (FR); Ozgur Dural, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,351

(22) Filed: Mar. 20, 2012

(65) Prior Publication Data

US 2012/0177138 A1    Jul. 12, 2012

Related U.S. Application Data (62) Division of application No. 12/413,262, filed on Mar. 27, 2009.

(60) Provisional application No. 61/041,131, filed on Mar. 31, 2008.

(51) Int. Cl.
*H04L 27/28* (2006.01)
*H04L 27/36* (2006.01)

(52) U.S. Cl.
USPC .......................................... 375/298; 375/260

(58) Field of Classification Search
CPC ... H04L 1/0041; H04L 1/0058; H04L 5/0007; H04L 5/0044; H04L 5/0041; H04L 5/006; H04L 27/2626; H04L 27/2646; H04L 27/28
USPC .................. 375/260, 261, 295, 298
See application file for complete search history.

(56) References Cited

U.S. PATENT DOCUMENTS

| | | | |
|---|---|---|---|
| 2005/0128993 | A1 | 6/2005 | Yu et al. |
| 2006/0171481 | A1 | 8/2006 | Ionescu |
| 2006/0215603 | A1 | 9/2006 | Nishio et al. |
| 2007/0140364 | A1 | 6/2007 | Ouyang et al. |
| 2007/0263737 | A1 | 11/2007 | Li et al. |
| 2009/0245401 | A1 | 10/2009 | Chrabieh et al. |

FOREIGN PATENT DOCUMENTS

| | | | |
|---|---|---|---|
| CN | 1625164 | A | 6/2005 |
| CN | 1756246 | A | 4/2006 |
| CN | 1830189 | A | 9/2006 |
| CN | 1983914 | A | 6/2007 |

(Continued)

OTHER PUBLICATIONS

Boutros and Viterbo, "Signal space diversity: A power- and bandwidth-efficient diversity technique for the Rayleigh fading channel," IEEE Trans. Inform. Theory, vol. 42, pp. 502-518, Mar. 1996.

(Continued)

*Primary Examiner* — Betsy Deppe
(74) *Attorney, Agent, or Firm* — S. Hossain Beladi; Brian Lambert (57) ABSTRACT

Techniques for rotating and transmitting multidimensional constellations are disclosed. A method for rotating a multidimensional constellation may include constructing a first rotation matrix, constructing a second rotation matrix, applying orthogonality constraints to the first and second rotation matrices; selecting an optimizing rotation matrix from the first and second rotation matrices; and rotating the multidimensional constellation using the optimizing rotation matrix. Constructing the first rotation matrix and second rotation matrices may include constructing a first column that includes first matrix dements based on the number of axes in the multidimensional constellation, and additional columns that include permutations of the first matrix elements.

24 Claims, 6 Drawing Sheets

(56) References Cited

FOREIGN PATENT DOCUMENTS

| | | |
|---|---|---|
| CN | 200987177 Y | 12/2007 |
| EP | 0721264 A1 | 7/1996 |
| EP | 1533966 A2 | 5/2005 |
| EP | 1791283 A1 | 5/2007 |
| EP | 1798926 A1 | 6/2007 |
| JP | 2004312291 A | 11/2004 |
| JP | 2005160079 A | 6/2005 |
| WO | WO-9600470 A1 | 1/1996 |
| WO | 2005011226 A1 | 2/2005 |
| WO | WO-2006035841 A1 | 4/2006 |
| WO | WO-2006100767 A1 | 9/2006 |

OTHER PUBLICATIONS

Boutros J., "Signal Space Diversity: A Power—and Bandwidth—Efficient Diversity Technique for the Rayleigh Fading Channel" IEEE Transactions on Information Theory, IEEE, US, vol. 44, No. 4, Jul. 1, 1998, XP011027095 ISSN: 0018-9448.

International Search Report and Written Opinion—PCT/US2009/038888—ISA/EPO—Nov. 30, 2009.

M. Brehler and M. K. Varanasi, "Training-codes for the noncoherent multi-antenna block-Rayleigh-fading channel," Proc. 37th Conf. Information Sciences and Systems, Baltimore, MD, Mar. 12-14, 2003.

M.L. McCloud, "Analysis and design of short block OFDM spreading matrices for use on multipath fading channels," IEEE Trans. Comm., vol. 53, pp. 656-665, Apr. 2005.

Nghi H Tran; Ha H Nguyen; Tho Le-Ngoc: "Bit-Interleaved Coded OFDM With Signal Space Diversity: Subcarrier Grouping and Rotation Matrix Design" IEEE Transactions on Signal Processing, IEEE Service Center, New York, NY, US, vol. 55, No. 3, Mar. 1, 2007, pp. 1137-1149, XP011165456 ISSN: 1053-587X the whole document.

Nghi H Tran; Ha H Nguyen; Tho Le-Ngoc: "Performance of BICM-ID with Signal Space Diversity" IEEE Transactions on Wireless Communications, IEEE Service Center, Piscataway, NJ, US, vol. 6, No. 5, May 1, 2007,pp. 1732-1742, XP011181441 ISSN: 1536-1276 the whole document.

Standard ECMA-368, "High Rate Ultra Wideband PHY and MAC Standard", 2nd Edition, Dec. 2007, ECMA International, Geneva, Switzerland.

Tran N H, et al., "Multidimensional Subcarrier Mapping for Bit-Interleaved Coded OFDM With Iterative Decoding" IEEE Transactions on Signal Processing, IEEE Service Center, New York, NY, US, vol. 55, No. 12, Dec. 1, 2007, pp. 5772-5781, XP011195708 ISSN: 1053-587X the whole document.

3GPP TR25.892 Feasibility Study for OFDM for UTRAN enhancement version 3.1 , Sep. 5, 2003.

European Search Report—EP12157378—Search Authority—Munich—Jul. 10, 2012.

Taiwan Search Report—TW098110729—TIPO Oct. 23, 2012.

| Optimum Constellation Rotation ||||
|---|---|---|---|
| Dimensions | SNR | Optimization | Rotation Angle (rd) |
| 2D | 18 dB | MinBER | 0.32 |
| 4D | 27 dB | MinBER | 1.214, 1.214, 0.382, -0.382, 0.104, 0.1044 |
| 4D | 17 dB | MinBER | 1.360, 1.360, 0.320, -0.320, 0.211, 0.211 |
| | | | SYMMETRY ALGORITHM RESULTS |
| 4D | 27 dB | MinBER | R=(0.337, 0.337, 0.854, 0.208) |
| 4D | 17 dB | MinBER | R=(0.259, 0.259, 0.894, 0.259) |

FIG. 6

MULTIDIMENSIONAL CONSTELLATIONS FOR CODED TRANSMISSION

RELATED APPLICATION

The present Application for Patent claims priority to U.S. Ser. No. 12/413,262, filed Mar. 27, 2009, entitled Multidimentional Constellations for Coded Transmission; which claims priority to Provisional Application No. 61/041,131 entitled "Multi-dimensional Constellations for Coded Transmission in Fading Channels" filed Mar. 31, 2008, and assigned to the assignee hereof and hereby expressly incorporated by reference herein in its entirety,

BACKGROUND

1. Field

This disclosure is generally related to wireless communications, and more particularly, to techniques for rotating and transmitting multidimensional constellations in wireless communication systems.

2. Background

In high data rate orthogonal frequency division multiplexing (OFDM) systems such as, but not limited to, WiMedia ultra-wideband (UWB), channel diversity can be a major concern. In such systems, related codewords may span multiple subcarriers. The distance between a first codeword and a second related codeword may not span enough of the subcarriers to maintain efficient communications. If some of the subcarriers fade, the codewords may be difficult to distinguish.

Various techniques have been employed to increase codeword diversity without providing a complete solution. One technique, discussed by Boutros and Viterbo in "Signal space diversity: A power- and bandwidth-efficient diversity technique for the Rayleigh fading channel," IEEE Trans. Inform. Theory, vol. 42, pp. 502-518, March 1996; and M. L. McCloud, in "Analysis and design of short block OFDM spreading matrices for use on multipath fading channels," IEEE Trans, Comm., vol. 53, pp. 656-665, April 2005, is to group several uncorrelated subcarriers to form a multidimensional constellation. In such systems, the subcarriers may be modeled as, or viewed as, the axes of the constellation.

However, any subcarrier/axes of the multidimensional constellation that collapse or fade may lead to constellation points falling on top of each other along the non-fading axes. The constellation points may no longer be discernible and the error rate in the transmission may increase. On the other hand, if the multidimensional constellation is properly rotated, the constellation points may remain distinct when one subcarrier collapses. If the multidimensional constellation is properly rotated the constellation may improve codeword diversity without an increase in transmitted power or bandwidth.

Known techniques for rotating multidimensional constellations include: (1) For space time codes (STC), minimizing the bit error rate (BER) as a function of a rotation vector, expressed as Θ, while expressing the BER as a weighted average; (2) Minimizing the symbol error rate (SER); and (3) minimizing the maximum of a modified Chernoff approximation for all vectors. Techniques for rotating multidimensional constellations may include the assumption that dimensions are complex.

Rotating multidimensional constellations for STCs by minimizing the BER as a function of the rotation vector Θ while expressing the BER as a weighted average is discussed by M. Brehler and M. K. Varanasi in "Training-codes for the noncoherent multi-antenna block-Rayleigh-fading channel," Proc. 37$^{th}$ Conf. Information Sciences and Systems, Baltimore, Md., Mar. 12-14, 2003. This technique may work in the presence of coding where soft bits enter the succeeding stages in the receiver.

Rotating multidimensional constellations by minimizing the SER is discussed by M. L. McCloud in "Analysis and design of short block OFDM spreading matrices for use on multipath fading channels," IEEE Trans. Comm., vol. 53, pp. 656-665. April 2005, which is entirely incorporated herein. Such techniques may work for uncoded systems with BER when the system does not include packet error rate (PER) requirements.

Rotating multidimensional constellations by minimizing the maximum of a modified Chernoff approximation for all vectors is discussed by Boutros and Viterbo, in the article referenced above. This technique may not improve the average error rate, and the technique may leave some codewords with little diversity, and therefore prone to errors when subcarrier fades occur. In a variation of this technique, the diversity order may be maximized to combat fading, which may result in a majority of error vectors spanning multiple dimensions. The variation may be suitable for uncoded modulations with PER, rather than BER, requirements. This variation may guarantee that the weakest (worst case) codeword has enough protection.

In their article referenced above, Boutros and Viterbo have also discussed techniques for rotating multidimensional constellations that may also include the use of a maximum product distance rule that may necessitate a full diversity for all error vectors. Such techniques may also include using a unique variable, expressed as "λ" by J. Boutros and E. Viterbo, in the article referenced above, in order to avoid dealing with the large number of possible rotations in high dimensions and the large number of variables associated with high dimensions. Techniques associated with the unique variable also include incorporating one or more constraints on the allowed rotations. Techniques also include the use of a Hadamard-like structure in which sub--matrices and their combinations are optimized.

SUMMARY

While various techniques have been employed for rotating multidimensional constellation, the known techniques do not provide an optimum solution and may include undesirable limitations. A need exists for better techniques for rotating and transmitting multidimensional constellation in wireless communication systems.

Disclosed herein is a new and improved approach for rotating and transmitting multidimensional constellations in wireless communication systems.

In accordance with an aspect of the approach, a method of rotating a multidimensional constellation includes constructing a first rotation matrix wherein a first column of the first rotation matrix includes first matrix elements based on the number of axes in the multidimensional constellation, and additional columns of the first rotation matrix include a first set of permutations of the first matrix elements; constructing a second rotation matrix wherein a first column of the second rotation matrix includes the first matrix elements based on the number of axes in the multidimensional constellation, and additional columns of the second rotation matrix include a second set of permutations of the first matrix elements; applying orthogonality constraints to the first and second rotation matrices; selecting an optimizing rotation matrix from the first and second rotation matrices; and rotating the multidimensional constellation using the optimizing rotation matrix.

In accordance with another aspect of the approach, an apparatus includes means for constructing a first rotation matrix wherein a first column of the first rotation matrix includes first matrix elements based on the number of axes in the multidimensional constellation, and additional columns of the first rotation matrix include a first set of permutations of the first matrix elements; means for constructing a second rotation matrix wherein a first column of the second rotation matrix includes the first matrix elements based on the number of axis in the multidimensional constellation, and additional columns of the second rotation matrix include a second set of permutations of the first matrix elements; means for applying orthogonality constraints to the first and second rotation matrices; means for selecting an optimizing rotation matrix from the first and second rotation matrices; and means for and rotating the multidimensional constellation using the optimizing rotation matrix.

In accordance with a further aspect of the approach, a computer-readable medium, embodying a set of instructions executable by one or more processors, includes code for constructing a first rotation matrix wherein a first column of the first rotation matrix includes first matrix elements based on the number of axes in a. multidimensional constellation, and additional columns of the first rotation matrix include a first set of permutations of the first matrix elements; code for constructing a second rotation matrix wherein a first column of the second rotation matrix includes the first matrix elements based on the number of axis in the multidimensional constellation, and additional columns of the second rotation matrix include a second set of permutations of the first matrix elements; code for applying orthogonality constraints to the first and second rotation matrices; code for selecting an optimizing rotation matrix from the first and second rotation matrices; and code for rotating the multidimensional constellation using the optimizing rotation matrix.

In accordance with another aspect of the approach, a method of rotating a multidimensional constellation includes determining a number of constellation points in the constellation; determining a number of dimensions in the constellation; determining a plurality of weighting factors associated with the dimensions for the constellation points; adjusting the weighting factors so that the constellation points span a plurality of dimensions; and rotating the constellation using the weighting factors.

In accordance h another aspect of the approach, a method of rotating a multidimensional constellation includes identifying a plurality of constellation points in the multidimensional constellation; calculating a plurality of error probabilities for a plurality of multidimensional constellations, wherein calculating the plurality of error probabilities includes determining the dimensions in the constellation and a number of constellation points per dimension; and rotating the multidimensional constellation based on the error probabilities.

In accordance with a further aspect of the approach, a method of transmitting a multidimensional constellation using a plurality of subcarriers, the method includes dividing a carrier into a plurality of subcarrier groups, where the subcarrier groups are sized based on the number of dimensions in the constellation; dividing a data packet into a plurality of subpackets, the subpackets including a subcarrier group identifier; assigning a first of the plurality of subcarrier groups to the first of the plurality of subpackets; assigning a second of the plurality of subcarrier groups to the second of the plurality of subpackets; transmitting the plurality of subpackets to a receiver; determining whether to continue using the first subcarrier group based on the quality of the transmission of the first of the plurality of data packets, where the subcarrier group identifier may be used to assess the quality of the transmission; and determining whether to continue using the second subcarrier group based on the quality of the transmission of the second of the plurality of data packets.

Other systems, methods, aspects, features, embodiments and advantages of the improved techniques for rotating and transmitting multidimensional constellations disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims.

BRIEF DESCRIPTION OF THE DRAWINGS

It is to be understood that the drawings are solely for purpose of illustration, Furthermore, the components in the figures are not necessarily to scale, emphasis instead being placed upon illustrating the principles of the apparatus and methods disclosed herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used herein to mean "serving as an example, instance, or illustration," Any feature, embodiment or variant described herein as "exemplary" is not necessarily to be construed as preferred or advantageous over other features, embodiments or variants. All of the embodiments and variants described in this description are exemplary embodiments and variants provided to enable persons skilled in the art to make and use the invention, and not necessarily to limit the scope of legal protection afforded the appended claims.

Figure 1:
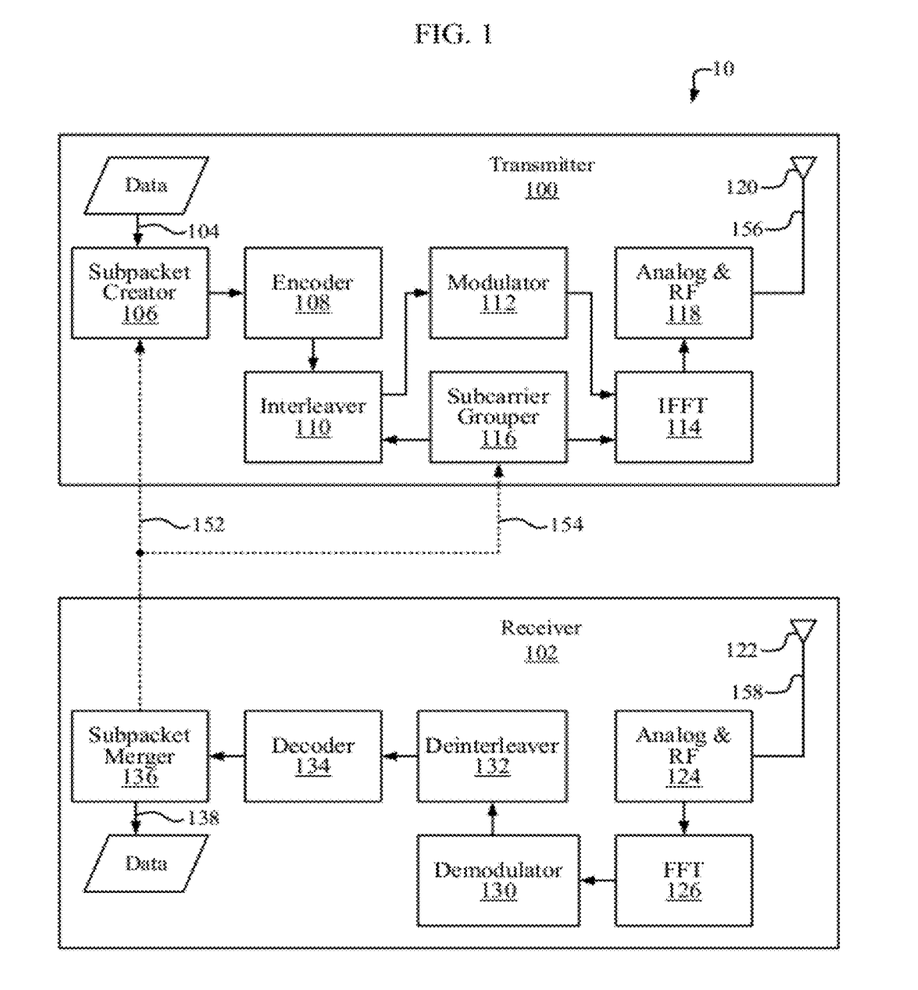
FIG. 1 is a block diagram of an exemplary wireless communication system that includes a constellation rotator and a constellation interleaver.

FIG. 1 shows a block diagram of an exemplary wireless communication system 10 including a transmitter 100 and a receiver 102. The wireless communication system 10 may be configured to operate on one or more wireless communication networks. Examples of suitable wireless communications networks include, but are not limited to, ultra-wide band (UWB) networks, WiMedia UWB, code-division multiple access (CDMA) based networks, orthogonal frequency division multiplexing (OFDM), WCDMA, GSM, UTMS, AMPS, PHS networks or the like. The transmitter 100 includes a subpacket creator component 106, an encoder 108, a constellation interleaver 110, a modulator 112, an inverse fast Fourier transform (FFT) 114, a subcarrier grouper 116, an analog & radio frequency (RF) component 118, and an antenna 120.

The encoder 108 may form a codeword by placing a constellation point, for example a constellation point defined by vectors, within a multidimensional constellation. A codeword may be information associated with one or more data points placed in a spatial structure. A constellation may be a mathematical representation of a spatial structure, wherein a codeword may be expressed as a location within the spatial structure," A constellation point may be a discrete location in a constellation. The constellation interleaver 110 may interleave the constellation point onto a plurality of subcarriers. A subcarrier may be a distinct signal on a radio frequency carrier between a transmitter and a receiver in a wireless communication system. The transmitter 100 provides transmitted data, which may, at least in part, be in the form of a plurality of constellation points within a plurality of multidimensional constellations, onto an outgoing carrier signal through the antenna 120 to the receiver 102.

The receiver 102 includes an analog & RE component 124, a fast Fourier transform (FFT) 126, a demodulator 130, a deinterleaver 132, a decoder 134, and a subpacket merger component 136. An antenna 122 may receive the carrier signal from the transmitter 100, including the plurality of constellation points within a plurality of multidimensional constellations. The deinterleaver 132 may recover portions of the constellation point from the subcarrier grouping formed in the transmitter 100, and the decoder 134 may reform the constellation point from the portions recovered by the deinterleaver 132.

Returning to the transmitter 100, the subpacket creator component 106 may receive data in the form of packets or frames on a line 104. The subpacket creator component 106 may break the data into a plurality of subpackets based, at least in part, upon feedback information provided on a line 152. On the line 152, the receiver 102 may provide information to the transmitter 100 regarding whether subpackets have been successfully sent by the transmitter 100 and received by the receiver 102. The subpackets may each include a checksum.

The data in the subpackets may then be transformed into the plurality of constellations points by the encoder 108. The constellation interleaver 110 may then interleave the constellation points onto a plurality of subcarrier groups identified by the subcarrier grouper 116. On a line 154, the receiver 102 may provide feedback information to the transmitter 100 regarding whether prior subpackets associated with subcarrier groupings have been successfully sent by the transmitter 100 and received by the receiver 102. The subcarrier grouper 116 may then use successful subcarrier groupings until channel conditions change.

A channel may be the medium over which cooperating devices in a wireless communication system exchange information. A channel may support a plurality of subcarriers. The receiver 102 may be informed of the kind of grouping that is in use by means such as but not limited to, placing a few bits in the transmitted header to inform the receiver 102 of the sub-groupings that are in use.

The interleaver 110 may then provide the interleaved constellation points to the modulator 112. The modulator 112 modulates the interleaved constellations points onto a baseband signal. In some configurations, the modulator 112 locates the interleaved constellation points onto a multidimensional constellation that has been rotated according to any of the rotational techniques disclosed herein below.

The IFFT 114 receives the modulated signal and the identity of the subcarrier grouping from the subcarrier grouper 116 and provides the inverse transformed signal to the analog and RE component 118.

If the input to the IFFT 114 is in the form of a vector, the IFFT 114 may provide an inverse discrete Fourier transform (DFT) of the vector. If the input to the IFFT 114 is in the form of a matrix, the IFFT 114 may provide the inverse DFT of each column of the matrix. The analog and RF component 118 may provide the combined baseband signal and carrier signal to the antenna 120 on a line 156.

Returning to the receiver 102, the antenna 122 provides the incoming carrier signal combined with the baseband signal to the analog and RE component 124 on a line 158. The analog and RE component 124 separates the carrier signal and provides a received baseband signal to the FFT 126. The FFT 126 provides a transformed received baseband signal to the demodulator 130. The demodulator 130 provides the plurality of subcarrier signals to the deinterleaver 132. In some configurations, the demodulator de-rotates the constellation. The deinterleaver 132 provides the identity of the subcarrier grouping and the subcarrier signals to the decoder 134. The decoder 134 recovers the plurality of constellation points created by the encoder 108. The subpacket merger 136 uses the received constellation points to provide merged subpackets to form the packets or frames to provide the received data on a line 138.

The subpacket merger 136 may also provide feedback to the transmitter 100, as illustrated with the dashed lines 152 and 154. The feedback to the transmitter 100 may be sent through a second transmitter (not shown) associated with the receiver 102, and the feedback may be received via a second receiver (not shown) associated with the transmitter 100. The lines 152 and 154 are, thus, figurative representations of feedback paths that may transmit information from the receiver 102 to the transmitter 100, in any manner, including via the second transmitter (not shown) that may use the antenna 122 to transmit information to the second receiver (not shown) using the antenna 120.

The decoder 134 may be any compatible type of decoder known to those having ordinary skill in the art, including but not limited to, a near ideal log-likelihood decoder, a minimum mean square error (MMSE) equalizer, a zero forcing (ZF) equalizer, a sphere decoder or the like. The MMSE or ZF equalizer may be configured to invert the channel and to de-rotate the received constellation. A more optimal log likelihood ration (LLR) decoder may work directly on the rotated and channel-altered transmitted constellation point. However, the near ideal log--likelihood decoder may present problems when the received constellation includes three or more dimensions. The MMSE and a ZF equalizer may lead to performance loss. The sphere decoder may require complex hardware.

Figure 2:
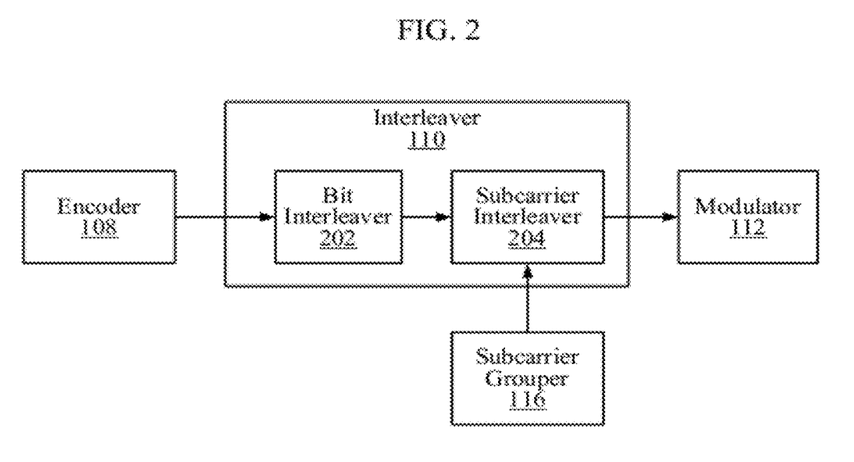
FIG. 2 is a block diagram of the constellation interleaver of FIG. 1.

FIG. 2 shows a block diagram of the constellation interleaver 110 of FIG. 1. The constellation interleaver 110 may include a bit interleaver 202 and a subcarrier interleaver 204. In addition to interleaving coded bits, constellation dimensions may also be interleaved over the subcarriers, artificially creating varying channel conditions. In the constellational interleaver 110, the subcarrier grouping may continuously change. Alternatively, once a good interleaving is found, the interleaving may be fixed until the channel changes, Depending upon the channel's layout, one subcarrier grouping may be good, while another subcarrier grouping may be bad. If the interleaved subcarrier grouping were fixed, some channels might be unlucky and incur a large number of bit errors, while other channels might be relatively lucky and not incurring any bit errors. Bit errors tend to be bursty. Hence, the packet error rate (PER) may be virtually improved, even while the worst case channels may be excessively penalized. A had channel may persist for several minutes in the context of UWB.

Alternatively, if the interleaved subcarrier grouping constantly changes, equality may be achieved among channels. The bit error rate (BER) may be improved by this enhanced diversity. However, the PER might suffer because many data packets may include at least one instance of a bad subcarrier grouping, and a good chance of a bit error. One bit error may be sufficient to eliminate the packet. For example, if a unique checksum is used one bit error might eliminate the packet.

The constellation interleaver 110 and the feedback paths on the lines 152 and 154 may address the problem. The constellation interleaver 110 may include a first stage and a second stage, such as the bit interleaver 202 as a first stage and the subcarrier interleaver 204 as the second stage. The subpacket creator component 106 may break the data into a plurality of subpackets where each subpacket may include a checksum. Within the subpacket, the subcarrier grouping may be fixed. However, a plurality of subcarrier groupings may be used for different subpackets which may improve the data rate for most channels.

There may be an undesirable delay between the time a channel changes and the time the transmitter 100 is informed of the desirable grouping. In some circumstances, the transmitter 100 may be able to determine a good subcarrier grouping without waiting for the feedback. For example, in a time-division duplexing (TDD) systems, where the channel can be known at the transmitter side, algorithms may predict what groupings may work, and what grouping may not work. For example, it may be beneficial to avoid using two weak subcarriers inside the same group of dimensional subcarriers. In some circumstances, including the feedback system may increase the transmission time, power requirements, and processing time.

A rotated multidimensional constellation may be viewed as a block code where each constellations point is selected in such a way as to span as many dimensions as possible, where the dimensions represent subcarriers. A dimension may be an axis of a constellation's spatial structure. A subcarrier may be mathematically modeled as a dimension of a constellation. For example, a constellation point (2, 0, 0, 0) may be a less than optimal choice, while a constellation point (1, 1, 1, 1) may be a better choice because it spans more dimensions in the constellation. The exemplary constellation rotation techniques illustrated herein generally seek to maximize the minimum distance between constellation points after any one dimension collapses.

Although the illustrated constellation rotation techniques may be practiced with coded and encoded modulation schemes, including space time codes (STC), for illustrative purposes, the use of the present constellation rotation techniques is generally described herein in the context of the bit interleaved coded modulation (BICM) system. Those having ordinary skill in the art will recognize that the techniques illustrated herein can be practiced with other modulation systems. In BICM systems, one important metric is not directly related to the constellation point, but instead to the soft bits carried by the constellation point.

For illustrative purposes, this description focuses on square constellations with Gray mapping. It may be difficult to find a good bit labeling system for each constellation point in some spatial systems, for example a hexagonal with a number of points that is a power of 2. Gray numbering may work well for square constellations by ensuring that only one bit at a time changes between neighboring points.

Such square constellations may look like typical quadrature amplitude modulation (QAM) constellations. Constellation dimensions are often assumed to be complex. In practical problems the dimensions are often real. Quadrature I/Q modulation is often used in wireless communication systems. The Quadrature I/Q modulation baseband signal is expressed in the complex plane. However, when combining several subcarriers to form a multidimensional constellation, the I and Q channels of the same subcarrier are correlated and may fade together. However, the and Q channels from a first subcarrier may be isolated and independently grouped with and/ or Q channels from uncorrelated subcarriers. At the receiver 102, a first de-rotation operation may be performed, for example by the demodulator 130, to separate the I and Q channels and process them independently. Hence, each dimension in the space may be modeled as a real dimension.

The illustrated constellation rotation techniques may employ a more precise approximation for the Chernoff bound. Prior constellation rotation techniques often employed a maximum product distance rule that may necessitate a full diversity for all error vectors. In place of the maximum product distance rule used in prior constellation rotations, the illustrated constellation rotation techniques allow optimizations over all rotations. The illustrated constellation rotation techniques may optimize over the BER.

Although the approaches described herein are general to many communication channels known in the art, for illustrative purposes the channels considered are mainly the Rayleigh channel with ideal interleaving, and the IEEE 802.15.3a's channel CM2 with realistic interleaving. IEEE 80115.3a's channel CM2 is the channel model used by WiMedia UWB. CM2 is approximately Rayleigh, so the primary difference is the interleaving scheme. The Ricean channel is not as harsh as the Rayleigh channel since the fades are not as deep. In the illustrations provided herein, the rotation of the multidimensional constellation is generally optimized by considering independent Rayleigh fading per dimension. This assumption is generally valid since dimensional subcarriers can be grouped together that are relatively far from each other and that fade independently. But in practical systems, the number of subcarriers may be limited and subcarriers may have to be recycled, i.e., reused again and again, within the same transmitted data packet.

In the illustrative exemplary mathematical model discussed below, it is assumed that the interleaver, for example the constellation interleaver 110, is ideal and that subcarriers are independent in order to reduce complexity while calculating constellation rotations.

For 2-dimensional constellations, there is a unique rotation angle around the center. In 3-dimensional constellations, there are 3 rotation angles for a solid like the cubic grid (e.g., Euler angles). In 4-dimensional constellations, there are 6 such rotations. In general, there is one rotation for every combination of 2 axes. In D-dimensions, there are $$\binom{D}{2}$$

possible rotations. In 5-dimensional constellations, there are 10 possible rotations. Due to calculation complexity, constellation dimensions may be limited to 4. However, as illustrated below, symmetry may be used to reduce calculation complexity and to allow consideration of dimensions greater than 4.

As the number of constellations dimensions increases, the number of possible rotations may increase dramatically, along with the number of constellation points in the constellation (or constraints) to be taken into account. The law of diminishing returns may apply as dimensions are increased.

A rotation of angle $\theta_{ii'}$ around axes i and i' may be modeled by a Givens rotation matrix $R_2(\theta_{ii'})$ of size D×D. For example, if D=4, i=2, i'=4 then, $$R_2(\theta_{ii'}) = \begin{pmatrix} 1 & 0 & 0 & 0 \\ 0 & \cos(\theta_{ii''}) & 0 & -\sin(\theta_{ii''}) \\ 0 & 0 & 1 & 0 \\ 0 & \sin(\theta_{ii''}) & b & \cos(\theta_{ii''}) \end{pmatrix} \quad \text{Eq. (1)}$$

The overall rotation matrix in D dimensions is the product of $R_2$ matrices for all combinations of i and i'≠i.

$$R(\Theta) = \prod_{i,i' \neq i} R_2(\theta_{ii'}), \quad \text{Eq. (2)}$$

where $\Theta$ represents a vector of the rotations $\theta_{ii'}$. Starting from an unrotated constellation point $u_k$, we may obtain the rotated constellation point $x_k = R(\Theta)u_k$. The transmitter may transmit $x_k$, for example the transmitter 100 may transmit $x_k$ from the antenna 120. At a receiver, a decoder may attempt to undo the rotation to obtain an estimate of $u_k$, which may be designated $\hat{u}_k$. For example, at the receiver 102 the decoder 134 may attempt to undo the rotation to obtain $\hat{u}_k$.

Signal Model

In OFDM, and similar wireless communication systems, a one-tap channel per subcarrier may be used. In such systems, a complex baseband signal with I/Q components may be transmitted. However, in the illustrated constellation rotation techniques the I and Q components may be isolated at a receiver, for example receiver 102, via derotation in the demodulator 130. Hence, real only quantities may be considered. If h=a+jb represents the one-tap complex channel, after de-rotation, each component, I and Q, may see the same real channel equal to $\alpha = hh^*/|h| = |h| = \sqrt{a^2+b^2}$. The variable $\alpha$ is a positive scalar and is often Rayleigh or Ricean distributed.

D may represent the dimensions associated with the constellation space, where the dimensions are the real components only of D subcarriers. A transmitter, for example the transmitter 100, may send the $k^{th}$ point, $x_k$, of the multidimensional constellation, where integer $k \in [1,C]$, B represents the number of points per dimension, and $C=B^D$ is the total number of points in D dimensions. The $i^{th}$ component may be denoted $x_{ki}$ where integer $i \in [1,D]$. The transmission model for dimension i may be represented, $$y_i = \alpha_i x_{ki} + n_i, \quad \text{Eq. (3)}$$

where $\alpha_i$ represents the one-tap real channel, $n_i$ represents the real AWGN noise with zero mean and variance $\sigma^2 = N_0/2$ (noise variance per I or Q dimension), and $y_i$ represents the received signal.

Finding the optimal constellation rotation by measuring the BER, for each rotation angle, at the output of the decoder may be an intractable problem (except perhaps in 2D). The Chernoff bound, together with the union bound, metric may be used to predict the BER without running a full decoder. The Chernoff bound assumes a high SNR and estimates the error for each two constellation points, considered in isolation. The union bound and averaging may then provide the symbol error rate (SER) or BER. The illustrated constellation rotation techniques may include an improvement to the Chernoff bound that results in a more precise approximation.

The Chernoff upper bound may be used to assess the performance of a given multidimensional constellation. Essentially, two constellation points, $x_k$ and $x_j$, j≠k, may be isolated and the error probability of transmitting $x_k$ and decoding $x_j$ may be calculated. For independent Rayleigh fading, the Chernoff upper bound may be expressed as $$P_e(x_k \to x_j) = \int_0^\infty \cdots \int_0^\infty Q(\delta(\alpha_i)/\sigma) \prod_i P(\alpha_i) d\alpha_i \quad \text{Eq. (4)}$$

$$\lesssim \frac{1}{\prod_i \left[1 + \frac{1}{8\sigma^2}(x_{ji} - x_{ki})^2\right]},$$

where Q represents the Q function, $P(\alpha_i)$ represents the channel's probability distribution, and $\delta(\alpha_i) = \sqrt{\Sigma_i \alpha_i^2 (x_{ji} - x_{ki})^2 / 4}$ is the distance to the midpoint given the set of $\alpha_i$.

The Chernoff bound indicates that the error probability decreases if the vector $x_j \to x_k$ spans many dimensions: for a constant sum (i.e., energy), the product may be maximized when all components in all dimensions are equal. In particular, when $\sigma^2 \to 0$, we may obtain the maximum product distance rule, max $\prod_i |x_{ji} - x_{ki}|$.

With a high SNR and a high number of effective dimensions, the Chernoff upper bound may be a good approximation, up to a scaling factor, of the error probability for two isolated codewords. But the Chernoff upper bound may not be accurate enough when the effective number of dimensions is small, i.e., when the codewords $x_k$, and $x_j$ differ in only 1 or 2 dimensions. A modified Chernoff approximation may be expressed as $$P_e(x_k \to x_j) \approx \frac{K_1}{\prod_i \left[1 + \frac{K_2}{8\sigma^2}(x_{ji} - x_{ki})^2\right]}, \quad \text{Eq. (5)}$$

where constants $K_1$ and $K_2$ may be optimally fitted for each problem based on B, D, and the SNR. For a nominal SNR range of 15 to 25 dB, and for up to 4 dimensions, $K_2 \approx 1.2$ and may not vary much. $K_1$ may vary substantially but may be constant when the SNR is fixed, and may be ignored as a mere scaling factor. This modified Chernoff approximation may be used in the illustrated constellation rotation techniques.

The error vector may be defined by $e'_{kj} = x_j - x_k$, or its components $e'_{kji} = x_{ji} - x_{ki}$. Then the modified Chernoff approximation may be expressed as $$P_e(e'_{kj}) \approx \frac{K_1}{\prod_i \left[1 + \frac{K_2}{8\sigma^2} e'^2_{kji}\right]}. \quad \text{Eq. (6)}$$

The union upper bound may be used as an approximation for the error probability of transmitting $x_k$ and decoding any $x_j \neq x_k$ from the constellation, $$P_e(x_k) \approx \sum_{j \neq k} \frac{K_1}{\prod_i \left[1 + \frac{K_2}{8\sigma^2} e'^2_{kji}\right]} \quad \text{Eq. (7)}$$

Although the union bound is not a good approximation unless the SNR is very high, it may still work well at lower SNR because it acts like averaging.

The average SER may be expressed, $$P_s \approx \frac{K_1}{C} \sum_k \sum_{j \neq k} \frac{1}{\prod_i \left[1 + \frac{K_2}{8\sigma^2} e'^2_{kji}\right]} \quad \text{Eq. (8)}$$

Figure 3:
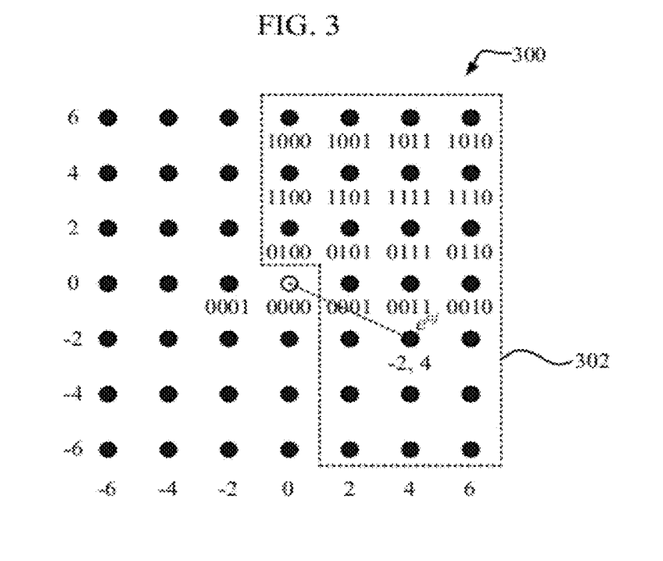
FIG. 3 is a graphical representation of an exemplary error constellation for a 2-dimensional constellation.

Assuming an original unrotated constellation point $u_k$ takes the four possible values $\{-3, -1, +1, +3\}$ per dimension, then the error vector $e_{kj} = u_j - u_k$ may take seven possible values $\{-6, -4, -2, 0, +2, +4, +6\}$ per dimension. FIG. 3 shows a graphical representation of an error constellation 300 for constellation point $u_k$ in 2-dimensions for $u_{ki} \in \{-3, -1, +1, +3\}$. The bit labeling illustrated in FIG. 3 indicates Hamming weights. Only the area inside a dashed line 302 may be considered since any point in the area outside the dashed line 302 is a negative version of a point inside the dashed line 302. The error metric is identical for the negative point.

The error constellation 300 is always centered at 0 when any constellation point $u_k$ is transmitted. Receipt of an error codeword 0 indicates no error. Receipt of any other codeword indicates an error in transmission. In the error constellation 300 the uniquely transmitted codeword is the center point 0. For convenience, the index k=o may be assigned to error codeword 0. All other codewords in the error constellation 300 may be expressed $e_{oj}$. The rotated error vector may be expressed as $e'_{oj} = R(\Theta) e_{oj}$.

The points in the error constellation 300 may occur with an occurrence frequency. For example, an adjacent point to error codeword 0 is an error vector that occurs in many situations because most unrotated constellation points $u_k$ have such an adjacent point in that same direction. On the other hand, a border point occurs less frequently because most unrotated constellation points $u_k$ do not have a point so far away in that direction. The occurrence frequency may be expressed as $$F_1(e_{oji}) = D + 1 - |e_{oji}|/2 \quad \text{Eq. (9)}$$

$$F(e_{oj}) = \prod_i F_1(e_{oji}),$$

where $F_1$ is the occurrence frequency of the error point in a given dimension, and F is the overall occurrence frequency in D dimensions. In Eq. 9, a transmitted constellation, per dimension, is of the form $\{\ldots, -3, -1, +1, +3, \ldots\}$.

The number of bit errors, Hamming distance, in the error constellation may then be determined. The Hamming distance in dimension i may be denoted by $H_i(e_{oji})$. For Gray mapping, $$H_1(e_{oji}) = H1(|e_{oji}|) \in 0, 1, 2, 1, \ldots \quad \text{Eq. (10)}$$

$$H_1(e_{oj}) = \sum_i H_1(e_{oji}),$$

where H is the overall Hamming distance in D dimensions. The BER may be expressed as the weighted average $$P_b \approx \frac{K_1}{CBD} \sum_{j \neq o} \frac{F(e_{oj}) H(e_{oj})}{\prod_i \left[1 + \frac{K_2}{8\sigma^2} e'^2_{oji}\right]} \quad \text{Eq. (11)}$$

where BD represents the number of bits per codeword. A similar formula can be written for the SER by omitting the Hamming weight and BD. Eq. 11 may indicate that the problem of finding a desired constellation rotation is the same as finding a constellation (the error constellation to be more precise), or block code, with some given weight (importance) per constellation point. Each point in the error constellation, and especially the points with a strong weight, should span as many dimensions as possible, i.e., the point should not be aligned with one or a few axes, but rather with diagonals.

The illustrated constellation rotation optimizations may include maximizing the minimum distance between constellation points after any one axis collapses. In some embodiments, these techniques may not use the Chernoff bound and may be suitable for certain non-Rayleigh fading channels. Using the error constellation it may be expressed as a maxmin $\|e'_{oj}\|^2 - e'^2_{oji}$ for every axis $i \in [1, D]$ that collapses (while other axes remain intact), and over all error symbols $e'_{oj}$.

The results may be excellent for 2D and the rotation may be geometrically constructed. A rotation angle of $\theta = \arctan(1/4) \approx 0.245$ may be obtained, and the constellation points may conveniently lie on integer boundaries. A small rotation angle may maintain good Gray mapping separation as an axis collapses.

Optimizations such as those described herein often converge to a local minimum. A nearly global minimum may be determined by repeating the optimizations several times, starting from a random angle each time. Minimizing the BER may be a gradient descent algorithm (e.g., fminsearch optimizer of Matlab). Due to various symmetries, the angles may be limited to the region $[0, \pi/2]$.

Figure 4:
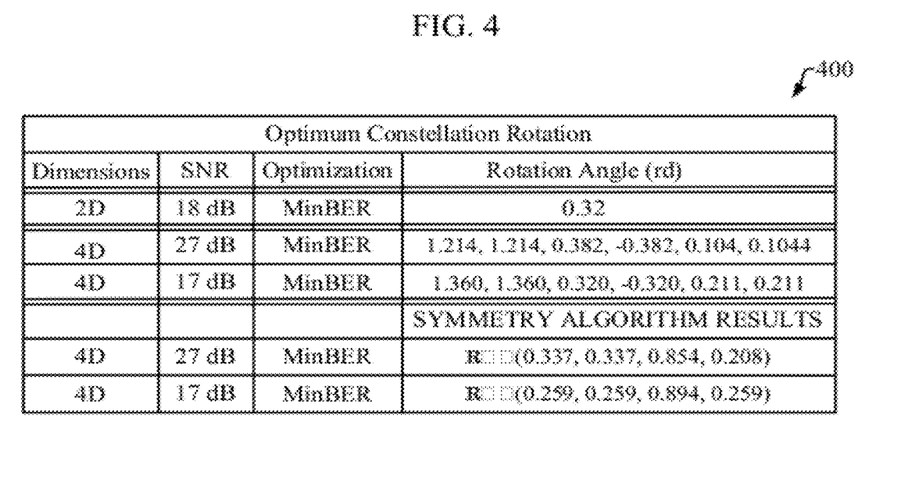
FIG. 4 is a table showing exemplary calculated optimum 2-dimensional and 4-dimensional constellation rotations.

FIG. 4 shows a table 400 that illustrates the nearly optimal angles that may be found using the illustrated constellation rotation techniques under some circumstances. Results were obtained for nominal SNR of 17 and 27 dB, and for B=2 (the results may not change significantly for B>2).

The rotations in 4D of the table 400 assume the following angle ordering: $\Theta = (\theta_{12}, \theta_{34}, \theta_{13}, \theta_{24}; \theta_{14}, \theta_{23})$. And the rotation matrix is $R(\Theta) = R_2(\theta_{12}) R_2(\theta_{34}) R_2(\theta_{13}) R_2(\theta_{24}) R_2(\theta_{14}) R_2(\theta_{23})$. The results in the table 400 indicate there may be a strong symmetry in 4D.

The number of possible rotations is large for space dimensions of 4 or more. In order to reduce problem complexity, constellation symmetry may be used to improve a Hadamard-like structure and to find more optimal solutions. Symmetry may be exploited to reduce the complexity of the constellation rotation optimization. Although illustrated in regard to 4-dimensional constellations, the methods illustrated may be extended to greater dimensions.

In 2-dimensional constellations, symmetry may be obvious. For example, in the error constellation the directions (1, 0) and (1, 1) may be considered as the most critical directions.

A rotation angle of π/8 places both directions in a symmetric position around the diagonal. The resulting constellation rotation is near optimal.

In 4-dimensional constellations, such symmetry may be harder to visualize. An alternative kind of symmetry is illustrated. In the error constellation, the four directions (1, 0, 0, 0), (0, 0, 0), (0, 0, 1, 0) and (0, 0, 0, 1), i.e., the four main axes that may be the most critical directions, may exhibit the same performance metric (Chernoff bound) at the optimum rotation. This is a form of symmetry. An alternative way of viewing this form of symmetry is that assuming illustrated constellation rotation techniques, rotating the weakest of the four vectors toward a diagonal which may strengthen the optimization; then rotating the two weakest vectors toward diagonals while maintaining their equal strength; and then rotating the three weakest until all four vectors are equally good. Even if the exemplary conjecture is less than optimal, the conjecture may still result in good solutions that can be further improved by using the (livens rotations method.

After rotating each of the four axes, (1, 0, 0, 0), (0, 1, 0, 0), (0, 0, 1, 0) and (0, 0, 0, 1), the 4 columns of the rotation matrix R(Θ) may be obtained. For these columns to exhibit equal Chernoff bound, and since this bound is a commutative product of (a function of) the elements, a sufficient condition is that each column contains a permutation of the same elements, with possible sign inversions. For example, if the first column is set to the positive quantities $(a, b, c, d)^T$, then the remaining columns may be formed by permutations of $\{\pm a, \pm b, \pm c, \pm d\}$. For odd dimensional constellations such permutation does not apply.

Due to symmetry, the sufficient condition may lead to some (of the many) optimal solutions. Without loss of generality, the second column can be set to the orthogonal vector $(-b, a, -d, c)^T$. And, in order to maintain orthogonality between the columns, only two configurations may be relevant:

$$R'(a, b, c, d) = \begin{pmatrix} a & -b & -c & d \\ b & a & -d & -c \\ c & -d & a & -b \\ d & c & b & a \end{pmatrix} \quad \text{Eq. (12)}$$

$$R''(a, b, c, d) = \begin{pmatrix} a & -b & -d & c \\ b & a & -c & -d \\ c & -d & a & -b \\ d & c & b & a \end{pmatrix} \quad \text{Eq. (13)}$$

In addition, orthogonality leads to ad=bc for R', or a=b for R". And, the unit norm condition, $a^2+b^2+c^2d^2=1$, applies to both matrices. In higher dimensions, there are similar structures.

The matrix R', Eq. 12, was proposed by J. Boutros and E. Viterbo, in "Signal space diversity: A power- and bandwidth-efficient diversity technique for the Rayleigh fading channel." IEEE Trans. Inform. Theory, vol. 42, pp. 502-518, March 1996 as matrix R' presents a particular Hadamard-like structure and is well suited for the sub-optimization disclosed by Boutros, et al.: i.e., first, optimize and fix a 2-dimensional matrix, then the remaining unknowns are parameterized with a unique variable λ to be determined.

The illustrated, constellation rotation techniques may include a two-parameter optimization: the above structures, Eq. 12 and Eq. 13, contain four unknowns, and two additional constraints have been shown for orthogonality and unit norm. Two additional parameters, b and c, may be optimized and may be expressed as functions of a and d. For matrix R'.

$$b^2 + c^2 = 1 - a^2 - d^2 \triangleq f_1 \quad 2bc = 2ad \triangleq f_2 \quad \text{Eq. (14)}$$

$$\Rightarrow \begin{cases} 2b = \sqrt{f_1 + f_2} + \sqrt{f_1 - f_2} \\ 2c = \sqrt{f_1 + f_2} - \sqrt{f_1 - f_2} \end{cases}$$

And for matrix R", $$b=a \quad c=\sqrt{1-2a^2-d^2}. \quad \text{Eq. (15)}$$

The problem may be optimized over a≤1 and $d \leq \sqrt{1-a^2}$, for matrix R' and matrix R". The best matrix may be retained. The illustrated constellation rotation techniques may produce an equivalent optimum to the one found via the Givens rotations, and may produce an optimum for matrix R". Results are shown in the table 400. It may be possible to invoke additional symmetry, for example, equal metrics, for $(1, 1, 0, 0)^T$ and $(1, 0, 1, 0)^T$, and reduce complexity even further.

Figure 5:
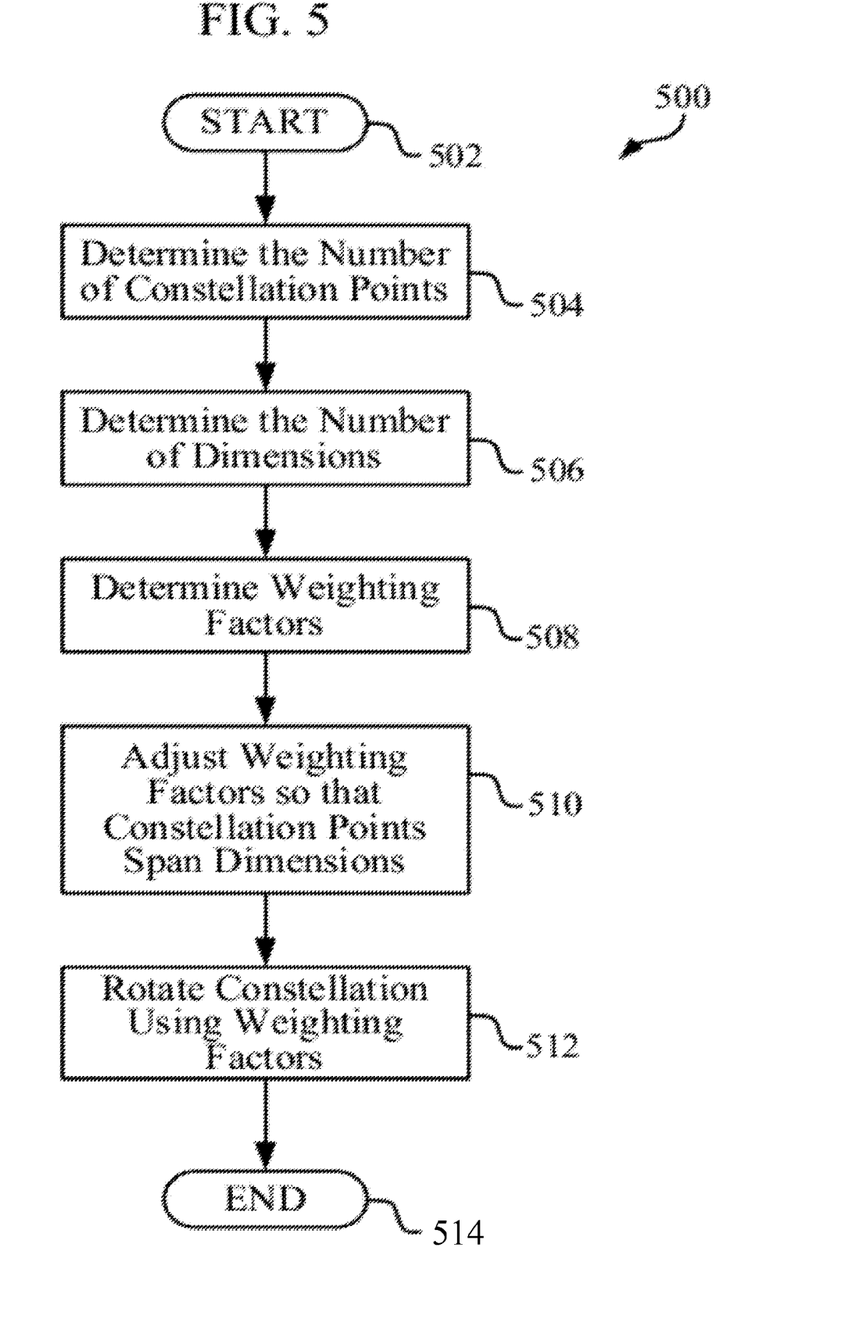
FIG. 5 is a flowchart illustrating a method of rotating a multidimensional constellation.

FIG. 5 shows a flowchart illustrating an exemplary method 500 for rotating multidimensional constellations in a wireless communication system, for example, the wireless communication system 10 shown in FIG. 1. The method 500 may begin, or be called to operate, with block 502. In block 504, a number of constellation points in the constellation may be determined.

In block 506, a number of dimensions in the constellation may be determined. For example, D may be determined for the multidimensional constellation. In block 508, a plurality of weighting factors associated with the dimensions for the constellation points may be determined Determining the weighting factors may include the use of Eq. 11.

In block 510, the weighting factors may be adjusted so that the constellation points span a plurality of dimensions. In block 512, the constellation may be rotated using the weighting factors. In block 514, the method 500 may terminate.

Figure 6:
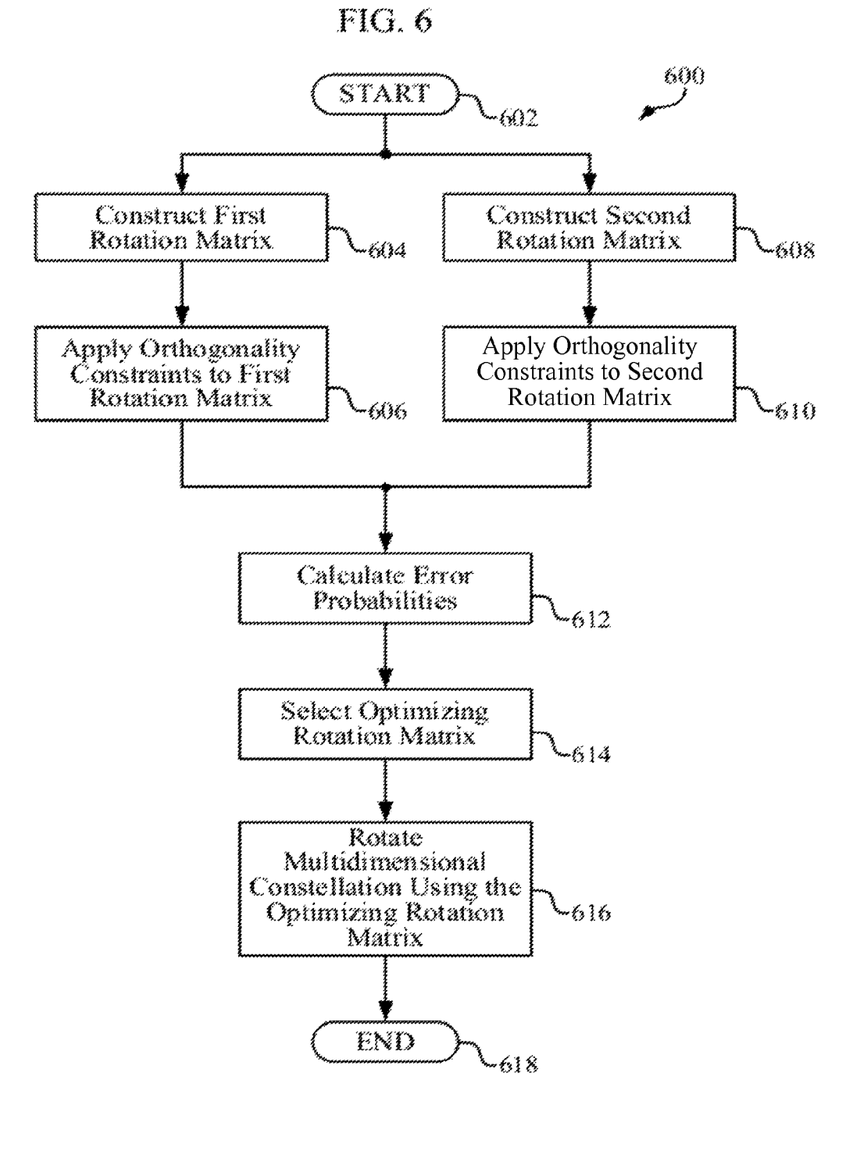
FIG. 6 is a flowchart illustrating a second method of rotating a multidimensional constellation.

FIG. 6 shows a flowchart illustrating another exemplary method 600 for rotating multidimensional constellations in a wireless communication system, for example, the wireless communication system 10 shown in FIG. 1. The method 600 may begin, or be called to operate, with block 602. In block 604, a first rotation matrix may be constructed. The first rotation matrix may have a first column that includes first matrix elements based on the number of axes in the multidimensional constellation. The first rotation matrix may have additional columns that include a first set of permutations of the: first matrix elements For example, the first rotation matrix may be constructed in the form of Eq. 12.

In block 606, orthogonality constraints may be applied to the first rotation matrix. For example, orthogonality leads to ad=bc for R' in Eq. 12, or a=b for R" in Eq. 13; and the unit norm condition, $a^2+b^2+c^2+d^2=1$, applies to R' and R'.

In block 608, a second rotation matrix may be constructed. The second rotation matrix may have a first column that includes the first matrix elements based on the number of axes in the multidimensional constellation. The second rotation matrix may have additional columns that include a second set of permutations of the first matrix elements. For example, the second rotation matrix may be constructed in the form of Eq. 13.

In block 610, orthogonality constraints may be applied to the second rotation matrix. For example, orthogonality leads to ad=bc for R' in Eq. 12, or a=b for R" in Eq. 13; and the unit norm condition, $a^2+b^2+c^2+d^2=1$, applies to R' and R".

In block 612, error probabilities may be calculated. For example, a plurality of error probabilities may be calculated for a plurality of multidimensional constellations, wherein calculating the plurality of error probabilities may include determining the dimensions in the constellation and a number of constellation points per dimension, In block 614, an optimizing rotation matrix may be selected based on the error probabilities. In block 616, the multidimensional constellation may be rotated based on the optimizing rotation matrix. For example, the optimizing rotation matrix may be applied to the multidimensional constellation. In block 618, the method 600 may terminate.

Figure 7:
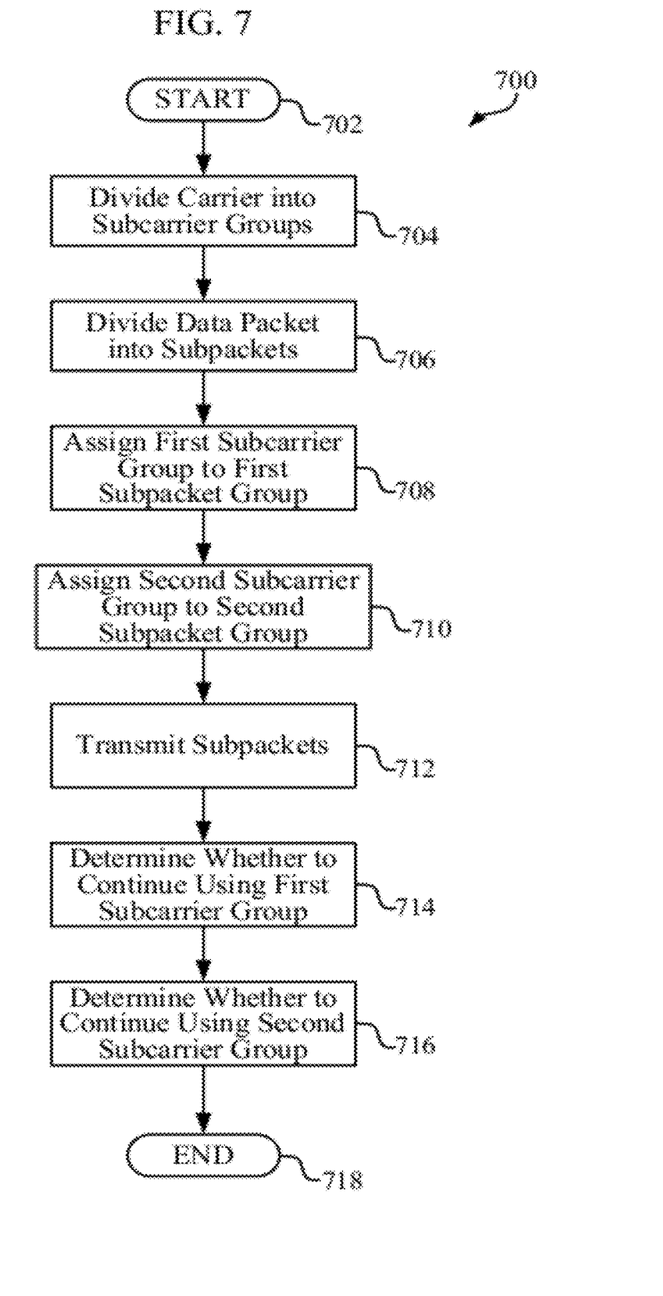
FIG. 7 is a flowchart illustrating a method of transmitting multidimensional constellations.

FIG. 7 shows a flowchart illustrating an exemplary method 700 for transmitting multidimensional constellations in a wireless communication system using a plurality of subcarriers, for example, the wireless communication system 10 shown in FIG. 1. The method 700 may begin, or be called to operate, with block 702.

In block 704, a carrier may be divided into a plurality of subcarrier groups. The number of subcarriers in the subcarrier group may be based on the number of dimensions in the constellation.

In block 706, a data packet may be divided into a plurality of subpackets, the subpackets may include a subcarrier group identifier. In block 708, a first of the plurality of subcarrier groups may be assigned to the first of the plurality of subpackets. In block 710, a second of the plurality of subcarrier groups may be assigned to the second of the plurality of subpackets.

In block 712, the plurality of subpackets may be transmitter to a receiver, for example, the receiver 102. In block 714, it may be determined whether to continue using the first subcarrier group based on the quality of the transmission of the first of the plurality of data packets. The subcarrier group identifier may be used to assess the quality of the transmission.

In block 716, it may be fed whether to continue using the second subcarrier group based on the quality of the transmission of the second of the plurality of data packets. In block 718, the method 700 may terminate.

The functionality, operations and architecture depicted by the blocks of the methods illustrated herein may be implemented using modules, segments, and/or portions of software and/or firmware code. The modules, segments, and/or portions of code include one or more executable instructions for implementing the specified logical function(s). In some implementations, the functions noted in the blocks may occur in a different order than that shown in FIGS. 5-7. For example, two blocks shown in succession in FIGS. 5-7 may be executed concurrently or the blocks may sometimes be executed in another order, depending upon the functionality involved.

In some embodiments, the techniques for rotating multidimensional constellations, such as those illustrated in FIGS. 5 and 6, may be performed prior to transmission of any data between a transmitter, for example the transmitter 100, and a receiver, for example the receiver 102. In some embodiments, the techniques for rotating multidimensional constellations may be performed during system design so that the modulator 112 and the demodulator 130 may be pre-configured to implement the results of the techniques for rotating and de-rotating multidimensional constellations, respectively. In some embodiments, the techniques for transmitting multidimensional constellations may include the methods illustrated in FIG. 7.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e a combination of a DSP and a microprocessor, a plurality of microprocessors or DSPs, one or more microprocessors in conjunction with a DSP core, or any other such configuration.

The blocks of the methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

If implemented in software, the methods, blocks, algorithms and functions described herein may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the view of these teachings. Therefore, the following claims are intended to cover all such embodiments and modifications when viewed in conjunction with the above specification and accompanying drawings.

What is claimed is:

1. A method of transmitting a multidimensional constellation using a plurality of subcarriers, the method comprising:
dividing a carrier into a plurality of subcarrier groups, where the subcarrier groups are sized based on a number of dimensions in the multidimensional constellation;
dividing a data packet into a plurality of subpackets, each of the subpackets including a subcarrier group identifier;
assigning a first group of the plurality of subcarrier groups to a first subpacket of the plurality of subpackets;
assigning a second group of the plurality of subcarrier groups to a second subpacket of the plurality of subpackets;
transmitting the plurality of subpackets to a receiver;
determining whether to continue using the first subcarrier group based on a quality of a transmission of the first subpacket of the plurality of subpackets, wherein the subcarrier group identifier of the first subcarrier group assigned to the first subpacket is usable to assess the quality of the transmission of the first subpacket of the plurality of subpackets; and
determining whether to continue using the second subcarrier group based on a quality of a transmission of the second subpacket of the plurality of subpackets.

2. The method of claim 1, further comprising receiving information corresponding to the quality of the transmission of the first subpacket from the receiver.

3. The method of claim 2, wherein the information corresponding to the quality of the transmission of the first subpacket indicates whether the first subpacket is successfully received by the receiver.

4. The method of claim 1, wherein the subcarrier group identifier of the first subcarrier group assigned to the first subpacket is usable to assess the quality of the transmission of the first subpacket based on information received from the receiver indicating whether the first subpacket is successfully received by the receiver.

5. The method of claim 1, further comprising rotating an initial constellation to produce the multidimensional constellation.

6. The method of claim 5, wherein rotating the initial constellation comprises:
constructing a first rotation matrix wherein a first column of the first rotation matrix includes first matrix elements based on a number of axes in the multidimensional constellation and additional columns of the first rotation matrix include a first set of permutations of the first matrix elements;
constructing a second rotation matrix wherein a first column of the second rotation matrix includes the first matrix elements based on the number of axes in the multidimensional constellation and additional columns of the second rotation matrix include a second set of permutations of the first matrix elements;
applying orthogonality constraints to the first and second rotation matrices;
selecting one rotation matrix from the first and second rotation matrices; and
rotating the initial constellation using the one rotation matrix.

7. The method of claim 6, further comprising calculating a plurality of error probabilities for the multidimensional constellation.

8. The method of claim 6, further comprising selecting the rotation matrix based on the plurality of error probabilities.

9. The method of claim 6, wherein each axis in the multidimensional constellation represents a subcarrier.

10. The method of claim 5, wherein rotating the initial constellation comprises:
determining a number of constellation points in the initial constellation;
determining a number of dimensions in the initial constellation;
determining a plurality of weighting factors associated with the dimensions for the constellation points;
adjusting the weighting factors so that the constellation points span a plurality of dimensions; and
rotating the initial constellation using the weighting factors.

11. The method of claim 5, wherein rotating the initial constellation comprises:
identifying a plurality of constellation points in the initial constellation;
calculating error probabilities for the initial constellation, wherein calculating the error probabilities includes determining the dimensions in the initial constellation and a number of constellation points of the plurality of constellation points per dimension; and
rotating the initial constellation based on the error probabilities.

12. A device for transmitting a multidimensional constellation using a plurality of subcarriers, the device comprising a processor configured to:
divide a carrier into a plurality of subcarrier groups, where the subcarrier groups are sized based on a number of dimensions in the multidimensional constellation;
divide a data packet into a plurality of subpackets, each of the subpackets including a subcarrier group identifier;
assign a first group of the plurality of subcarrier groups to a first subpacket of the plurality of subpackets;
assign a second group of the plurality of subcarrier groups to a second subpacket of the plurality of subpackets;
transmit the plurality of subpackets to a receiver;
determine whether to continue using the first subcarrier group based on a quality of a transmission of the first subpacket of the plurality of subpackets, wherein the subcarrier group identifier of the first subcarrier group assigned to the first subpacket is usable to assess the quality of the transmission of the first subpacket of the plurality of subpackets; and
determine whether to continue using the second subcarrier group based on a quality of a transmission of the second subpacket of the plurality of subpackets.

13. The device of claim 12, wherein the processor is further configured to receive information corresponding to the quality of the transmission of the first subpacket from the receiver.

14. The device of claim 13, wherein the information corresponding to the quality of the transmission of the first subpacket indicates whether the first subpacket is successfully received by the receiver.

15. The device of claim 12, wherein the subcarrier group identifier of the first subcarrier group assigned to the first subpacket is usable to assess the quality of the transmission of the first subpacket based on information received from the receiver indicating whether the first subpacket is successfully received by the receiver.

16. The device of claim 12, wherein the processor is further configured to rotate an initial multidimensional constellation to produce the multidimensional constellation.

17. The device of claim 12, wherein the processor is configured to rotate the initial constellation by:
  constructing a first rotation matrix wherein a first column of the first rotation matrix includes first matrix elements based on a number of axes in the multidimensional constellation, and additional columns of the first rotation matrix include a first set of permutations of the first matrix elements;
  constructing a second rotation matrix wherein a first column of the second rotation matrix includes the first matrix elements based on the number of axes in the multidimensional constellation, and additional columns of the second rotation matrix include a second set of permutations of the first matrix elements;
  applying orthogonality constraints to the first and second rotation matrices;
  selecting one rotation matrix from the first and second rotation matrices; and
  rotating the initial constellation using the one rotation matrix.

18. An apparatus for transmitting a multidimensional constellation using a plurality of subcarriers, the apparatus comprising:
  transmitter means for:
    dividing a carrier into a plurality of subcarrier groups, where the subcarrier groups are sized based on a number of dimensions in the multidimensional constellation;
    dividing a data packet into a plurality of subpackets, each of the subpackets including a subcarrier group identifier;
    assigning a first group of the plurality of subcarrier groups to a first subpacket of the plurality of subpackets;
    assigning a second group of the plurality of subcarrier groups to a second subpacket of the plurality of subpackets;
    transmitting the plurality of subpackets to a receiver means;
    determining whether to continue using the first subcarrier group based on a quality of a transmission of the first subpacket of the plurality of subpackets, wherein the subcarrier group identifier of the first subcarrier group assigned to the first subpacket is usable to assess the quality of the transmission of the first subpacket of the plurality of subpackets; and
    determining whether to continue using the second subcarrier group based on a quality of a transmission of the second subpacket of the plurality of subpackets.

19. The apparatus of claim 18, wherein the transmitter means is configured to receive information corresponding to the quality of the transmission of the first subpacket.

20. The apparatus of claim 19, wherein the information corresponding to the quality of the transmission of the first subpacket indicates whether the first subpacket is successfully received by the receiver means.

21. The apparatus of claim 18, wherein the subcarrier group identifier of the first subcarrier group assigned to the first subpacket is usable to assess the quality of the transmission of the first subpacket based on information received from the receiver means indicating whether the first subpacket is successfully received by the receiver means.

22. The apparatus of claim 18, wherein the transmitter means is configured to rotate an initial constellation to produce the multidimensional constellation.

23. A non-transitory computer readable medium comprising instructions that, when executed by a processor, cause the processor to:
  divide a carrier into a plurality of subcarrier groups, where the subcarrier groups are sized based on a number of dimensions in the multidimensional constellation;
  divide a data packet into a plurality of subpackets, each of the subpackets including a subcarrier group identifier;
  assign a first group of the plurality of subcarrier groups to a first subpacket of the plurality of subpackets;
  assign a second group of the plurality of subcarrier groups to a second subpacket of the plurality of subpackets;
  transmit the plurality of subpackets to a receiver;
  determine whether to continue using the first subcarrier group based on a quality of a transmission of the first subpacket of the plurality of subpackets, wherein the subcarrier group identifier of the first subcarrier group assigned to the first subpacket is usable to assess the quality of the transmission of the first subpacket of the plurality of subpackets; and
  determine whether to continue using the second subcarrier group based on a quality of a transmission of the second subpacket of the plurality of subpackets.

24. The non-transitory computer readable medium of claim 23, further comprising instructions that, when executed by the processor, cause the processor to rotate a initial constellation to produce the multidimensional constellation.

* * * * *